US012656156B1

(12) United States Patent
Thompson et al.

(10) Patent No.: US 12,656,156 B1
(45) Date of Patent: Jun. 16, 2026

(54) ELECTRODE FOR USE WITH MAGNETIC FLOWMETERS AND OTHER DEVICES

(71) Applicant: Thompson Equipment Company, Inc., Jefferson, LA (US)

(72) Inventors: Todd C. Thompson, New Orleans, LA (US); Thomas Meacham, Jr., Perkasie, PA (US)

(73) Assignee: Thompson Equipment Company, Inc., Jefferson, LA (US)

( * ) Notice: Subject to any disclaimer, the term of this patent is extended or adjusted under 35 U.S.C. 154(b) by 377 days.

(21) Appl. No.: 18/332,975

(22) Filed: Jun. 12, 2023

Related U.S. Application Data

(60) Provisional application No. 63/351,285, filed on Jun. 10, 2022.

(51) Int. Cl.
G01F 1/58 (2006.01)
(52) U.S. Cl.
CPC .................................... G01F 1/584 (2013.01)

(58) Field of Classification Search
CPC ....................................................... G01F 1/584
USPC ....................................................... 73/861.12
See application file for complete search history.

(56) References Cited

U.S. PATENT DOCUMENTS

2019/0186965 A1*  6/2019  Kimura ................... G01F 23/24
2021/0364331 A1*  11/2021  Mariager ................ G01F 1/588

* cited by examiner

*Primary Examiner* — Peter J Macchiarolo
*Assistant Examiner* — John M Royston
(74) *Attorney, Agent, or Firm* — Garvey, Smith & Nehrbass, Patent Attorneys, L.L.C.; Julie Rabalais Chauvin; Seth M. Nehrbass

(57) ABSTRACT

The present invention relates to an improved electrode apparatus. More particularly, the present invention relates to an improved electrode apparatus for use with/as a part of a magnetic flowmeter. Even more particularly, the present invention relates to an improved electrode design for use with/as a part of magnetic flowmeters that are capable of withstanding high pressures and a variety of corrosive slurries, acids, bases, and solvents.

13 Claims, 7 Drawing Sheets

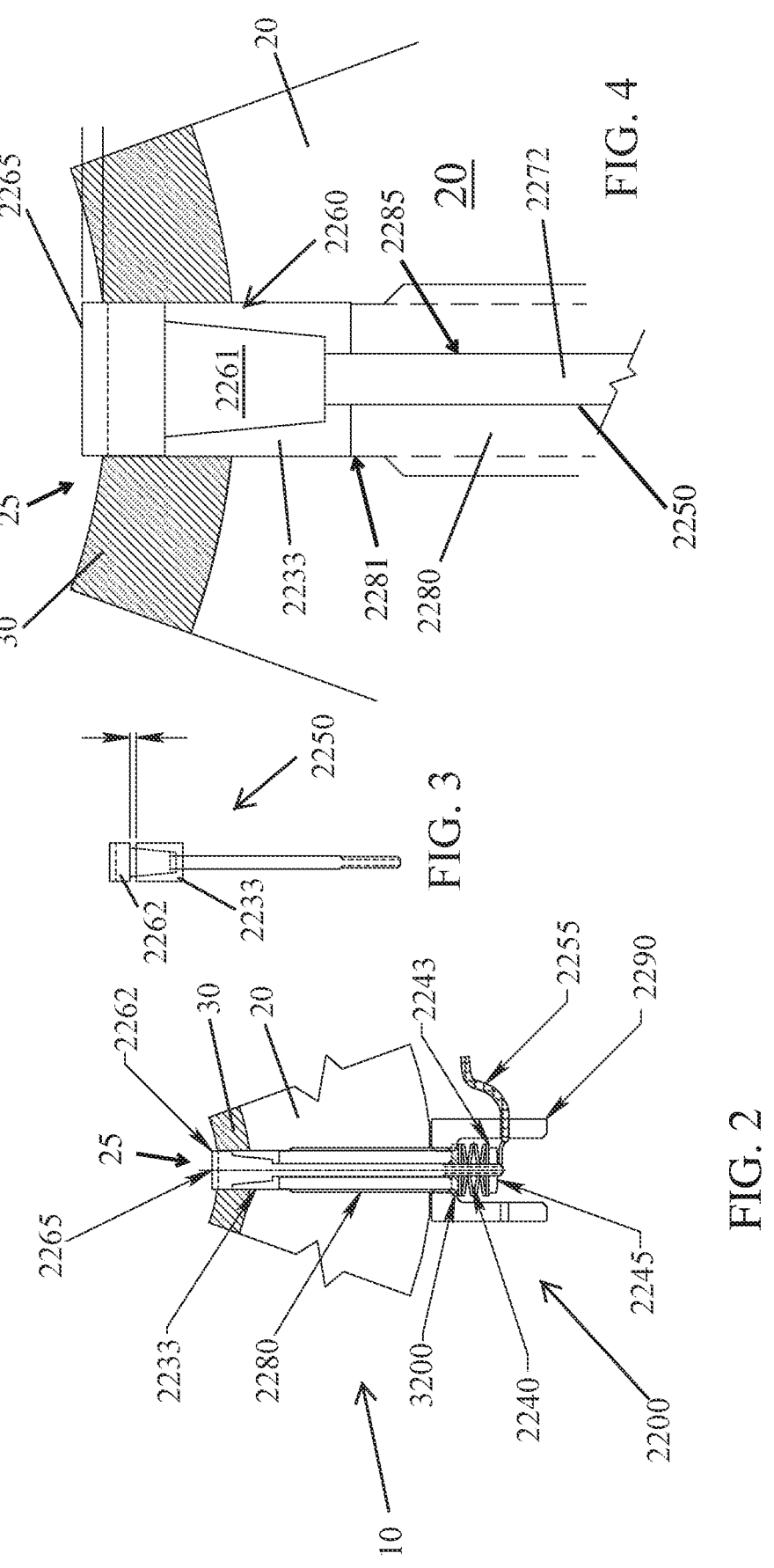

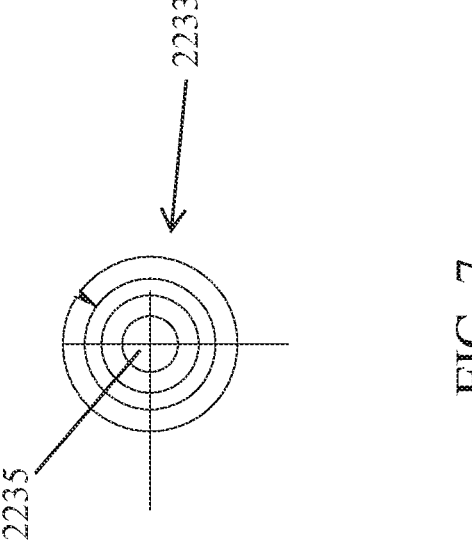
FIG. 7
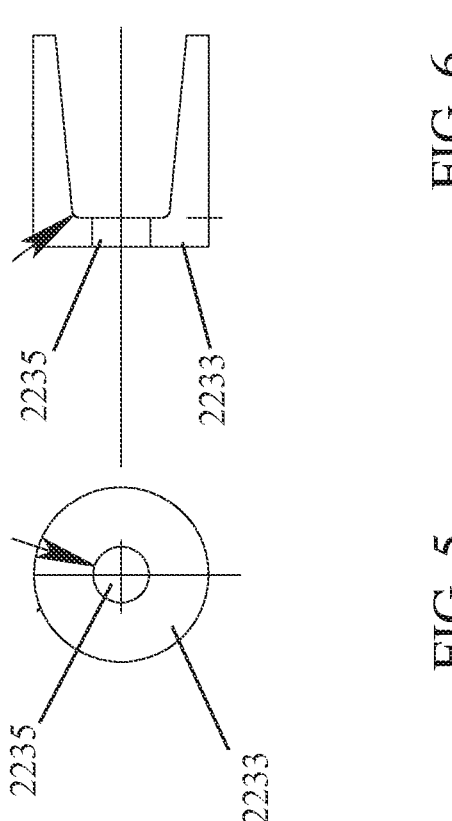
FIG. 6
FIG. 5

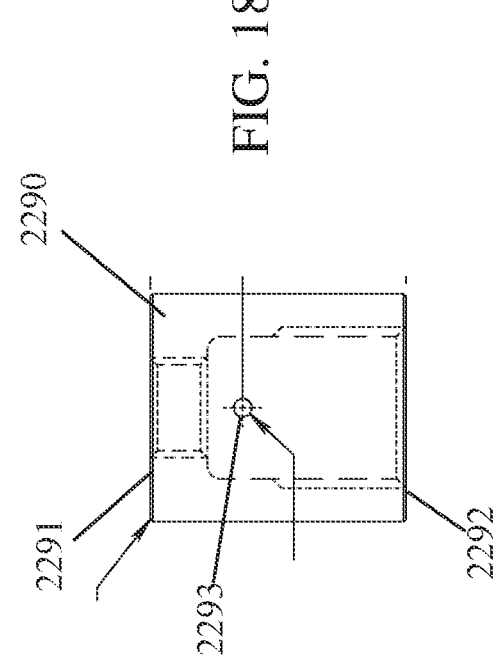
FIG. 18
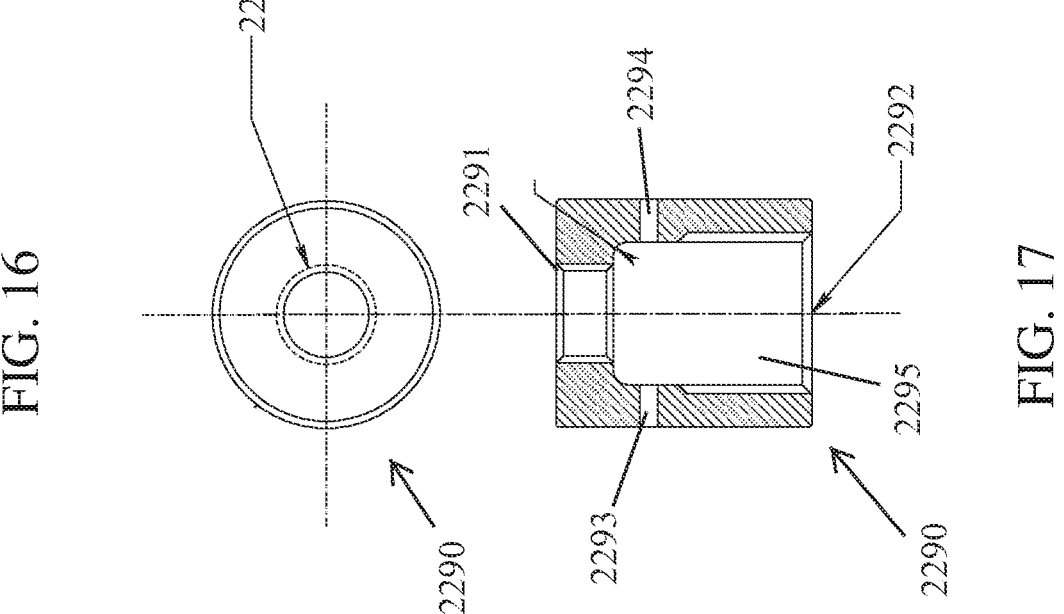
FIG. 16
FIG. 17

ELECTRODE FOR USE WITH MAGNETIC FLOWMETERS AND OTHER DEVICES

CROSS-REFERENCE TO RELATED APPLICATIONS

Priority is claimed to our U.S. Provisional Patent Application Ser. No. 63/351,285, filed 10 Jun. 2022, which is hereby incorporated herein by reference.

This application is related to U.S. patent application Ser. No. 17/074,536, filed on 19 Oct. 2020, which claims the benefit of U.S. Provisional Patent Application Ser. No. 62/923,041, filed on 18 Oct. 2019, both of which are hereby incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to an improved electrode assembly apparatus. More particularly, the present invention relates to an improved electrode assembly apparatus for use with/as a part of a magnetic flowmeter. Even more particularly, the present invention relates to an improved electrode assembly design for use with/as a part of magnetic flowmeters that are capable of withstanding high pressures and a variety of corrosive slurries, acids, bases, and solvents.

2. General Background of the Invention

Magnetic flowmeters, electromagnetic flowmeters, or magmeters are commonly used for measuring volumetric flow rates of fluids containing particles (ions) that are organized by the magnetic field passed through the conductive fluid. Conductive fluids in process control industries include, but are not limited to, water treatment facilities, chemical processing, pharmaceutical manufacturing, food and beverage production, and liquid hydrocarbon processing and extraction techniques.

Magnetic flowmeters functionally vary from other flow measurement technologies in that velocity flow is measured by application of Faraday's Law capitalizing upon electromagnetic interactions of charged particles within a fluid as it passes through a magnetic field orthogonal to the direction of flow. The magnetic field causes a separation of the charged particles within a cross section of the pipe. Once separated, the flow of charged particles is attached to the electrodes placed orthogonal to the magnetic field, which results in an electromotive force in the electrodes further resulting in a voltage differential between the electrodes. The flow rate is calculated as a function of the velocity times the cross-sectional area per unit length of time.

The advantage of magnetic flowmeters over other forms of flowmeters is twofold. First, magnetic flowmeters can operate in erosive and/or corrosive environments. Second, magnetic flowmeters do not mechanically hinder flow and, therefore, do not cause pressure drops.

Designing electrodes for magnetic flowmeters presents challenges, particularly for electrodes for use in magmeters that are capable of withstanding high pressures. It is crucial that the electrode is designed to withstand the high pressures magmeters are subjected to without compromising the integrity of the electrodes themselves and of the magmeter. The following U.S. Patents are incorporated herein by reference: U.S. Pat. Nos. 9,068,869; 10,969,260; 11,486,747.

BRIEF SUMMARY OF THE INVENTION

The present invention relates to an improved electrode assembly apparatus. More particularly, the present invention relates to an improved electrode assembly apparatus for use with/as a part of a magnetic flowmeter. Even more particularly, the present invention relates to an improved electrode assembly design for use with/as a part of magnetic flowmeters that are capable of withstanding high pressures and a variety of corrosive slurries, acids, bases, and solvents.

The present invention includes an electrode assembly, for use with a magnetic flowmeter, that has a maximum allowable operating pressure of 15,000 psi, but can withstand 22,500 psi.

The present invention includes an electrode preferably comprising an electrode shaft and an electrode head at one end of the electrode shaft. In a preferred embodiment, the electrode head has two ends: one end where it meets the electrode shaft, and the other end that has a face. Electrode head is preferably angled or somewhat trapezoidal in shape with the end that meets the shaft having a smaller diameter than the end of the head that has the face.

When the electrode assembly of the present invention is properly assembled and inserted within the flow tube of a magmeter and ready for use, electrode head face protrudes into the tube's inner bore. When the electrode assembly of the present invention is properly assembled and inserted within the flow tube of a magmeter and ready for use, a seal of preferably a 25% glass filled polytetrafluoroethylene (PTFE) (such as McMaster Carr 85275K34 or generic equivalent) surrounds electrode head. The seal that surrounds electrode head preferably has an angled opening that is sized and shaped to accommodate and fit the electrode head. The design of the seal utilizes cold flow (Creep) properties to conform to the space occupied by the seal in the flow tube thruholes. When a high pressure magmeter is in use, the pressure exerted on the face of the electrode head exerts force on the seal. The seal then energizes with equal and opposite forces to support this force, similar to a liquid. All surfaces of the seal press against the surfaces that the seal mates with/is up against, which provides sufficient force to seal off the migration of liquid passing through the flow tube of a magmeter. Therefore, the integrity of the electrodes and the magmeter is not compromised.

In various embodiments, some of the components of the present invention can be not of magnetically permissive materials, which does not affect the efficiency of the electrode in the magmeter. The present invention can be used for many high pressure requirements.

The present invention includes a magnetic flowmeter apparatus including a magnetic flow meter having a flow tube and an interior; an electrode shaft having two opposing ends, with a tip at one end and an electrode head at the other end; with said electrode head having a first component and a second component: wherein said first component has a varying diameter and two opposing ends, with one end interfacing with the shaft, and the other end interfacing with the second component: wherein said first component is generally trapezoidal in a side profile view with said diameter as generally smaller at the interface with said shaft than at the interface with said second component: wherein said second component has two opposing ends, with one said end interfacing with said first component and the other end providing a face; and wherein said face protrudes into said interior of the magnetic flowmeter. The present invention includes a magnetic flow meter apparatus with a face that includes a tungsten carbide disk. The present invention includes a magnetic flow meter apparatus wherein the second component is a tungsten carbide disk. The present invention includes a magnetic flow meter apparatus wherein the tungsten carbide disk is attached to the second component by spot weld. The present invention includes a magnetic flow meter apparatus wherein the second component is attached to the first component by spot weld. The present invention includes a magnetic flow meter apparatus wherein the first component diameter varies by about 11° between the interface with the shaft and the interface with the second component. The present invention includes a magnetic flow meter apparatus, wherein the tip of said electrode shaft is threaded (e.g., a 4-48 UNF 2A thread). The present invention includes a magnetic flow meter apparatus wherein the electrode is a Hastelloy® C276 or generic equivalent. The present invention includes a magnetic flow meter apparatus further comprising an exterior coating that provides electrical isolation from surrounding electrically conductive components. The present invention includes a magnetic flow meter apparatus with an exterior coating (e.g., an alcadyne flourinox coating). The present invention includes a magnetic flow meter apparatus wherein the exterior coating is between about 1 μm (micron) to about 10 μm (microns) thick. The present invention includes a magnetic flow meter apparatus, wherein heat shrink tubing is used on the electrode shaft. The present invention includes a magnetic flow meter apparatus, wherein heat shrink tubing is used on the electrode head. The present invention includes a magnetic flow meter apparatus, wherein heat shrink tubing is used on the electrode shaft. The present invention includes a magnetic flow meter apparatus, further including a seal that is sized and shaped to fit around the first component and a portion of the electrode shaft. The present invention includes a magnetic flow meter apparatus, wherein the seal is 25% glass filled polytetrafluoroethylene (PTFE). The present invention includes a magnetic flow meter apparatus that is capable of withstanding a pressure up to about 22,500 psi when the magnetic flowmeter is in use. The present invention includes a method of measuring flow using the magnetic flow meter apparatus of the present invention.

The present invention includes an electrode assembly for use with a magnetic flowmeter, including an electrode having a shaft and a head, with the shaft having two ends, with a tip at one end, and with the head at the other end: wherein the head includes a first component and a second component: wherein the first component has two ends with one said end interfacing with the shaft, and with said other end interfacing with the second component; wherein the second component has two ends, with one end interfacing with a face, wherein the face protrudes into the magnetic flowmeter, and with said other end interfacing with the first component: a seal that is sized and shaped to accommodate and fit around the first component of the electrode head and a portion of the electrode shaft, with the seal abutting the other end of the second component: a backup plug that has two ends and is sized and shaped to accommodate and fit around the shaft, with one of said ends abutting the seal and with said other end protruding out of the exterior of the magmeter: a shield with a lateral opening and a central opening that is sized and shaped to accommodate and fit said other end of the backup plug: an insulator disk having an opening that is sized and shaped to accommodate and fit around the tip of the electrode shaft: a spring washer or helical wire spring with two ends, one said end abutting the insulator disk, and the other said end abutting a washer: with the spring washer or helical wire spring surrounding the electrode shaft tip: a retaining nut abutting the washer and surrounding the electrode shaft tip; and electrode wiring threaded through the lateral opening of the shield so that the electrode assembly is ready for use and operation with the magnetic flowmeter. The present invention includes an electrode assembly with the face comprising a tungsten carbide disk. The present invention includes an electrode assembly, wherein said second component is a tungsten carbide disk. The present invention includes an electrode assembly, wherein the tungsten carbide disk is attached to the second component by welding. The present invention includes an electrode assembly, wherein the second component is attached to the first component by welding. The present invention includes an electrode assembly, wherein the tip of the electrode shaft is threaded (e.g., a 4-48 UNF 2A thread). The present invention includes an electrode assembly, wherein the electrode is a Hastelloy® C276 or generic equivalent. The present invention includes an electrode assembly further comprising an exterior coating that provides electrical isolation from surrounding electrically conductive components. The present invention includes an electrode assembly, wherein the exterior coating is an alcadyne flourinox coating. The present invention includes an electrode assembly, wherein the exterior coating is between about 1 μm (micron) to about 10 μm (microns) thick. The present invention includes an electrode assembly, wherein the electrode shaft is fitted with heat shrink tubing. The present invention includes an electrode assembly, wherein the electrode head is fitted with heat shrink tubing. The present invention includes an electrode assembly, wherein the electrode shaft is fitted with heat shrink tubing. The present invention includes an electrode assembly, wherein the seal is glass filled polytetrafluoroethylene (PTFE). The present invention includes an electrode assembly, wherein the face protrudes into the interior of the magnetic flowmeter at least about 0.05" (inches). The present invention includes an electrode assembly, wherein the insulator disk is unfilled peek material or unfilled polyvinylidene fluoride (PVDF). The present invention includes an electrode assembly, wherein the insulator disk is about 0.060" (inches) thick. The present invention includes an electrode assembly, wherein the shield is fashioned from stainless steel. The present invention includes an electrode apparatus, wherein the face protrudes into the interior of the magnetic flowmeter about 0.05" (inches). The present invention includes an electrode assembly, having an operating pressure of up to about 22,500 psi when the magnetic flowmeter is in use. The present invention includes an electrode apparatus, having an operating pressure of up to about 22,500 psi when the magnetic flowmeter is in use. The present invention includes a method of measuring flow using the electrode assembly of the present invention.

The present invention includes an electrode apparatus for use with a magnetic flowmeter, comprising an electrode shaft having two opposing ends, with a tip at one end and an electrode head at the other end: with the electrode head having a first component and a second component, wherein the first component has a varying diameter and two opposing ends, with one end interfacing with the shaft, and the other end interfacing with the second component: wherein the first component is generally trapezoidal in shape in a side profile view; with said diameter generally smaller at the interface with the shaft than at the interface with the second component: wherein the second component has two opposing ends, with one said end interfacing with the first component and the other end providing a face; and wherein the face protrudes into the interior of the magnetic flowmeter. The present invention includes an electrode apparatus, wherein the face comprises a tungsten carbide disk. The present invention includes an electrode apparatus, wherein the second component is a tungsten carbide disk. The present invention includes an electrode apparatus wherein the tungsten carbide disk is attached to the second component by spot weld. The present invention includes an electrode apparatus, wherein the second component is attached to the first component by spot weld. The present invention includes an electrode apparatus, wherein the first component diameter varies by about 11° between the interface with the shaft and the interface with the second component. The present invention includes an electrode apparatus, wherein the tip of the electrode shaft is a threaded connection (e.g., a 4-48 UNF 2A thread). The present invention includes an electrode apparatus, wherein the electrode is a Hastelloy® C276 or generic equivalent. The present invention includes an electrode apparatus, further comprising an exterior coating that provides electrical isolation from surrounding electrically conductive components. The present invention includes an electrode apparatus, wherein the exterior coating is an alcadyne flourinox coating. The present invention includes an electrode apparatus, wherein the exterior coating is between about 1 μm (micron) to about 10 μm (microns) thick. The present invention includes an electrode apparatus, wherein heat shrink tubing is used on the electrode shaft. The present invention includes an electrode apparatus, wherein heat shrink tubing is used on the electrode head. The present invention includes an electrode apparatus, wherein heat shrink tubing is used on the electrode shaft. The present invention includes an electrode apparatus, further comprising a seal that is sized and shaped to fit around the first component and a portion of the electrode shaft. The present invention includes an electrode apparatus, wherein the seal is glass filled polytetrafluoroethylene (PTFE). The present invention includes an electrode apparatus that is capable of withstanding a pressure up to about 22,500 psi when the magnetic flowmeter is in use. The present invention includes a method of measuring flow using the electrode apparatus of any the present invention.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 2 is a transverse view of a preferred embodiment of the apparatus of the present invention as installed within a magmeter;

FIG. 3 is a side view of a preferred embodiment of the apparatus of the present invention prior to insertion within the flow tube:

FIG. 4 is a transverse, close-up view of a preferred embodiment of the apparatus assembly of the present invention as installed within a flow tube of a magmeter:

FIGS. 5-7 are various views of a preferred embodiment of the electrode seal of the present invention:

FIGS. 16-18 are various views of a preferred embodiment of an electrode shield of the present invention.

DETAILED DESCRIPTION OF THE INVENTION

FIGS. 1-4 show a preferred embodiment of electrode 2250, which can be used with/as a part of magnetic flow meter/magmeter 10. Electrode 2250 includes shaft 2272 with electrode head 2260 at one end of shaft 2272 and tip, end or end portion 2275 at the opposite end of shaft 2272 (i.e., distal from head 2260). FIGS. 2 and 4 show electrode 2250 installed in magnetic flow meter/magmeter 10.

Figure 1:
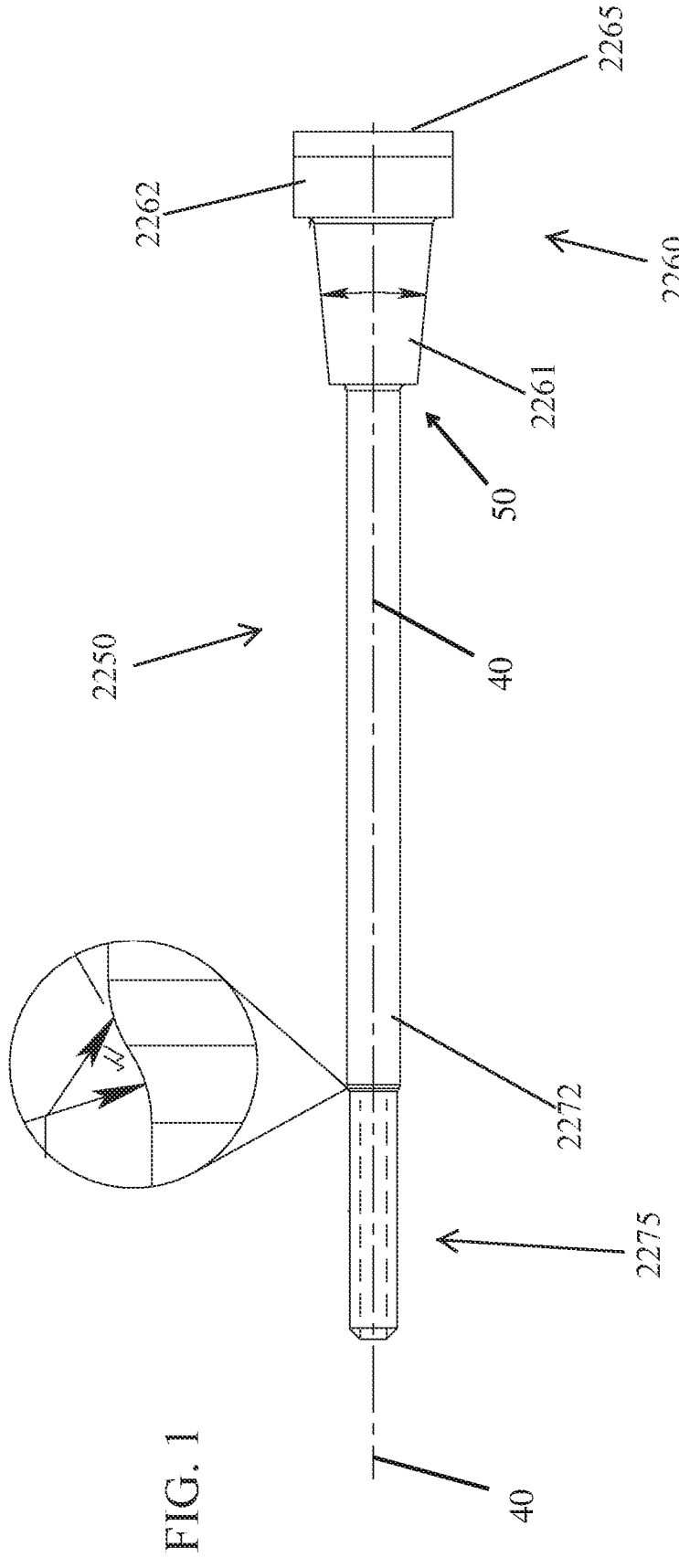
FIG. 1 is a side view of a preferred embodiment of the apparatus of the present invention.

Electrode head 2260 can include first component 2261 and second component 2262. The diameter of electrode head 2260 can be larger than the diameter of shaft 2272. First component 2261 of head 2260 can be angled with respect to central longitudinal axis 40 as shown in FIG. 1 (for example, at an 11° angle 50), and can be wider at its interface with second component 2262 than at its interface with shaft 2272.

First component 2261 can be generally trapezoidal in shape in a side view profile. As seen in FIG. 1, second component 2262 can include end or face 2265. Face 2265 can be a tungsten carbide disk connected (e.g., brazed) to second component 2262. Alternatively, face 2265 can be a disk made from a material other than tungsten carbide. In various embodiments, second component 2262 can entirely be a tungsten carbide disk. Second component 2262 and/or face 2265 can have a coating of a different material. When electrode 2250 is installed in a magmeter 10 (preferably a high pressure magmeter), face 2265 preferably protrudes into the interior 25 of the magmeter's tube or housing 20. In a preferred embodiment of the apparatus of the present invention, end 2275 can be a threaded connection, such as a 4-48 UNF 2A thread, for example. In one embodiment, electrode 2250) can be a Hastelloy® C276 or generic equivalent. A method of assembly of electrode 2250) can include the following steps: 1) lining up the tungsten carbide disk 2265 so that it is preferably concentric to second component 2262 (or in alternative embodiments, if second component 2262 is entirely a tungsten carbide disk, then second component 2262 is lined up so that it is concentric to first component 2261: or in alternative embodiments in which second component 2262 does not include a tungsten carbide disk, second component 2262 is still lined up so that it is preferably concentric to first component 2261), 2) attaching the disk 2265 to second component 2262 by spot weld (or, in alternative embodiments in which second component 2262 is entirely a tungsten carbide disk, component 2262 is attached to first component 2261 by spot weld), 3) applying a brazing alloy, such as Silvaloy 560 (the brazing alloy can be applied to second component 2262 and/or to disk 2265 and/or to first component 2261), 4) furnace brazing (per alloy manufacturer's time and temperature recommendations), and 5) cleaning up alloy migration past next surface (next surface can be the outside diameter of second component 2262 and/or the outside diameter of face/disk 2265: preferably, the next surface is the outside diameter of second component 2262 and the outside diameter of face/disk 2265). In alternative embodiments, the brazing alloy can be applied to one component and then mated with the other component. For example, the brazing alloy can be applied to disk 2265 and then mated with second component 2262 (or the brazing alloy can be applied to second component 2262 and then mated with disk 2265). In alternative embodiments, the brazing alloy can be applied to second component 2262 and then mated with first component 2261 (or the brazing alloy can be applied to first component 2261 and then mated with second component 2262). Steps 2 and 3 listed above can occur in reverse order. In alternative embodiments, the components to be mated (e.g., disk 2265 to second component 2262, or second component 2262 to first component 2261) are temporarily aligned, and then the liquid/paste alloy can be applied to the mating joint. During the heat cycle (e.g., furnace brazing), the brazing alloy hydroscopicly fills the microscopic gap. There can be a hard coating which provides electrical isolation from the surrounding electrically conductive components. For example, an alcadyne flourinox coating on electrode 2250) can be used that aids with the performance of seal 2233 and provides electrical insulation. Coating can be from about 1 μm (micron) to about 10 μm (microns) thick (or equivalent). In lieu of a micro thin coating, a heat shrink tubing could be used as insulation on the shaft 2272 and or the head 2260.

Figures 8, 9, 10, 11:
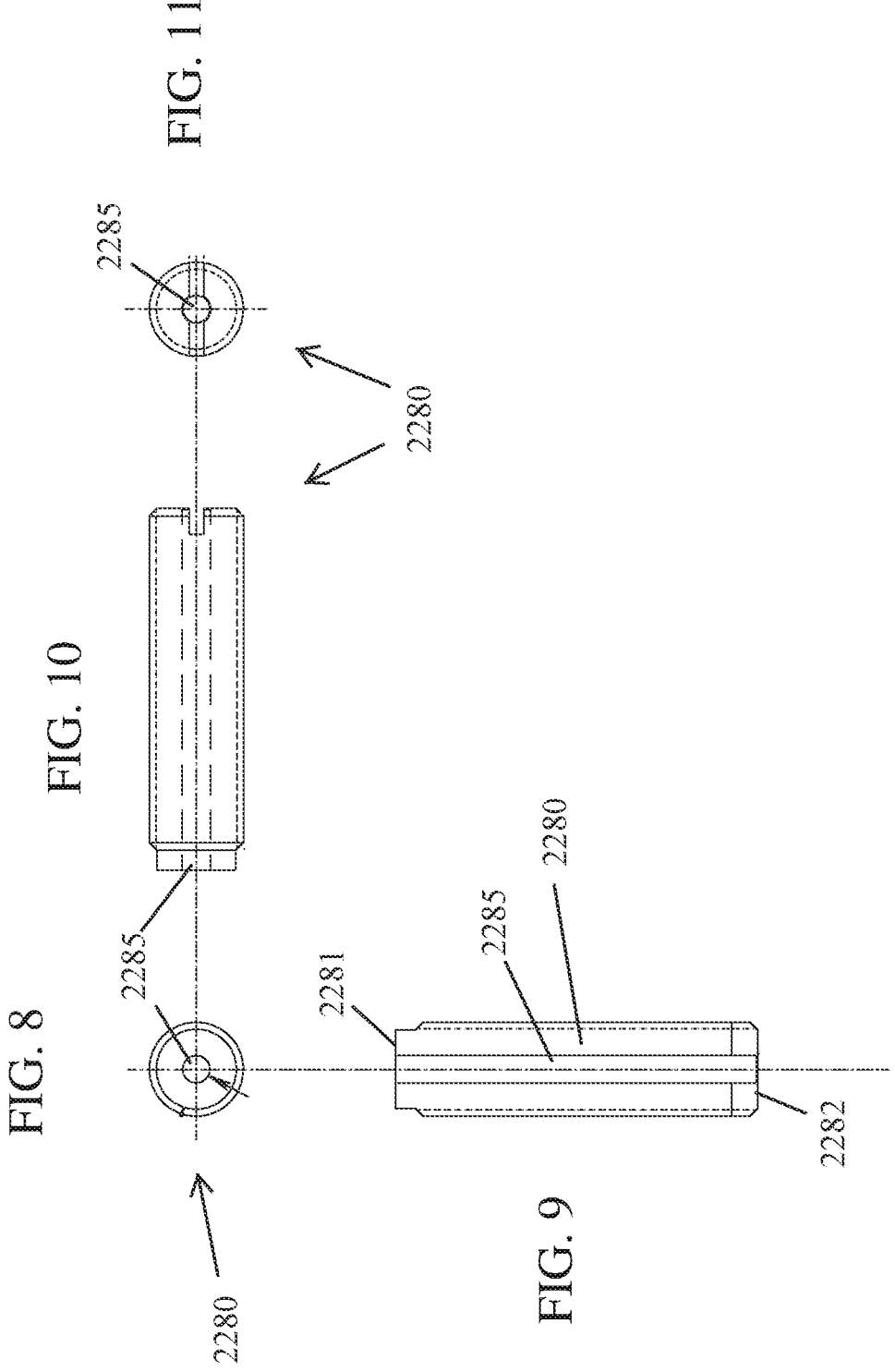
FIGS. 8-11 are various views of a preferred embodiment of the electrode backup plug of the present invention.

FIGS. 2 and 4 show preferred embodiments of the apparatus of the present invention electrode assembly 2200 attached or inserted in magmeter 10 and ready for use/operation of magmeter 10. Electrode receptacle thruholes 2370 are drilled into flow tube 20 at liner 30 of magmeter 10 (see FIGS. 14 and 15). Thruhole 2370 is sized and shaped to accommodate and fit back up plug 2280 and electrode 2250. In FIGS. 9-11, back up plug 2280 has bore/thruhole/opening 2285 that is sized and shaped to accommodate and fit electrode shaft 2272. Backup plug 2280 has ends 2281, 2282.

FIG. 4 shows a close-up, partial view of FIG. 2 with electrode shaft 2272 inserted within bore 2285 of back up plug 2280. Backup plug 2280 is inserted in electrode receptacle thruhole 2370 in tube 20 of magmeter 10. Tube 20 of magmeter 10 can be at least partially lined with liner 30. Liner 30 can be a partially stabilized magnesium zirconia (MgPSZ), which is an abrasion resistant ceramic trim that exceeds the capabilities of alumina or yttria zirconia. FIG. 4 shows electrode head 2260 inserted within seal 2233. Face 2265 of head 2260 is shown protruding slightly into the interior 25 of flow tube or pipe 20. As an example, face 2265 protrudes about 0.05" into the interior 25 of tube 20.

FIG. 3 shows electrode 2250 assembled with seal 2233 before insertion into thruhole 2370 of tube 20. Electrode 2250 assembled with seal 2233 can be tested for interference fit prior to insertion into pipe 20.

Once electrode 2250 is assembled with seal 2233 and inserted into thruhole 2370/backup plug 2280, shield 2290 (see FIGS. 2, 16-18) is attached, then electrode insulator disk 3200 is placed on tip 2275, followed by Belleville spring washers or helical wire spring 2240, then washer 2243, then retaining nut 2245, and then shield 2290 is tightened. Additional force is exerted on the face 2265 of electrode 2250 to press the cone 2261 of the electrode into the seal 2233. Electrode wire 2255 is then attached (e.g., with solder or wire lug) and threaded through second lateral opening 2294 of shield 2290.

FIGS. 5-7 show various views of a preferred embodiment of seal 2233, with FIG. 5 showing a bottom view of seal 2233, FIG. 6 showing a side view of seal 2233, and FIG. 7 showing a top view of seal 2233. As shown in FIGS. 4 and 6, seal 2233 is sized and shaped to fit around/engage with first component 2261 of electrode head 2260 (also shown in FIG. 2). Seal 2233 can be a 25% glass filled polytetrafluoroethylene (PTFE) (such as McMaster Carr 85275K34 or generic equivalent).

Figures 14, 15:
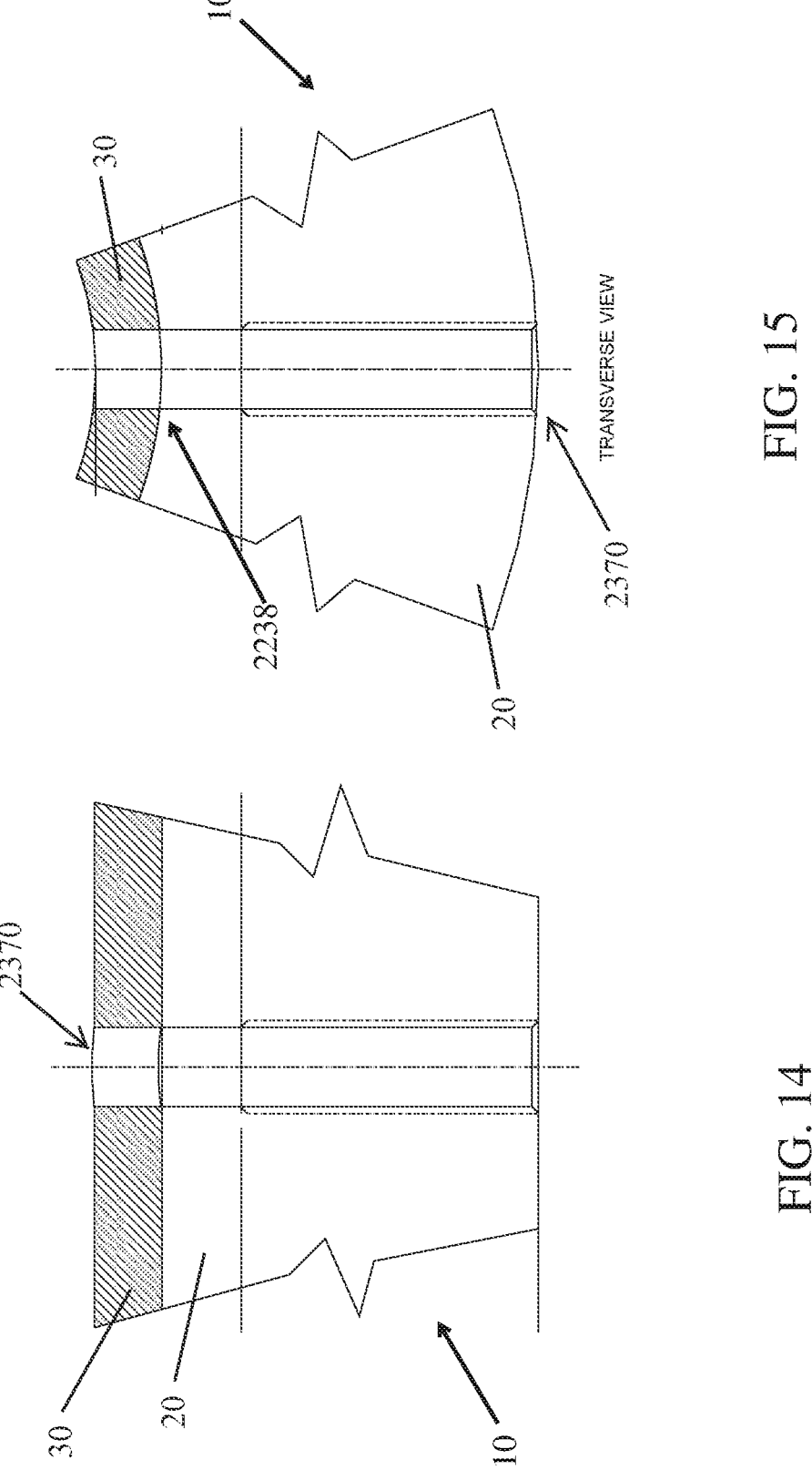
FIGS. 14 and 15 are various views of a preferred embodiment of electrode receptacle thruholes in a magmeter flowtube of the present invention.

Seal 2233 preferably has opening or bore 2235 that is sized and shaped to accommodate/fit around electrode shaft 2272. In one embodiment, seal 2233 can be about 0.5" in length. In one embodiment, seal 2233 can have an angled opening that mimics the outward angle of first component 2261. The shape and outward angle of first component 2261 forces the PTFE material of seal 2233 to completely fill the gland 2238 of the seal. (Gland 2238 is the space occupied by seal 2233, as shown in FIG. 15.) The design of seal 2233 utilizes cold flow (Creep) properties of PTFE to conform to the space/gland 2238 occupied by seal 2233 in thruhole 2370. When magmeter 10 is in use, the pressure exerted on face 2265 exerts force on seal 2233. Seal 2233 energizes with equal and opposite forces to support this force (from face 2265), similar to a liquid. Therefore, all surfaces of seal 2233 press against the surfaces that seal 2233 mates with (against backup plug 2280, shaft 2272, borehole 2370, first component 2261 and second component 2262: shown in FIG. 4), which provides sufficient force to seal off the migration of liquid passing through tube 20 of magmeter 10. The subject of excessive migration of the seal material has been addressed with minimizing the size of gaps between adjoining components.

The conical shape of first component 2261 of electrode 2250 provides additional force to PTFE seal 2233 during the initial process of making seal 2233 conform to the space it fits in (electrode thruhole 2370). In one embodiment, an 11° angle of first component 2261 and an 11° angle of the interior of seal 2233 provides outward force to expand the outer diameter of the PTFE to meet the bore of gland machined in the nitronic (could be any nonmagnetic/permissive material) body/tube 20, i.e., to fit securely within thruhole 2370 of tube 20.

FIGS. 8-11 show various views of another embodiment of backup plug 2280, which can be generally cylindrically shaped, and has two opposing ends 2281, 2282. End 2281 abuts/interfaces with seal 2233 (see FIG. 4). End 2282 abuts/interfaces with/is connected to insulator disk 3200 as shown in FIG. 2. Plug 2280 can be stainless steel (e.g., a 309 stainless steel bar—7/16 stock). Plug 2280 fits within electrode thruhole 2370 of tube 20. As shown in FIGS. 8-11, backup plug 2280 includes a central bore or opening 2285. Bore 2285 is preferably sized and shaped to accommodate and fit electrode shaft 2272 as shown in FIGS. 2 and 4. In a most preferred embodiment, plug 2280 is preferably about 1.7 inches in length.

Figures 12, 13:
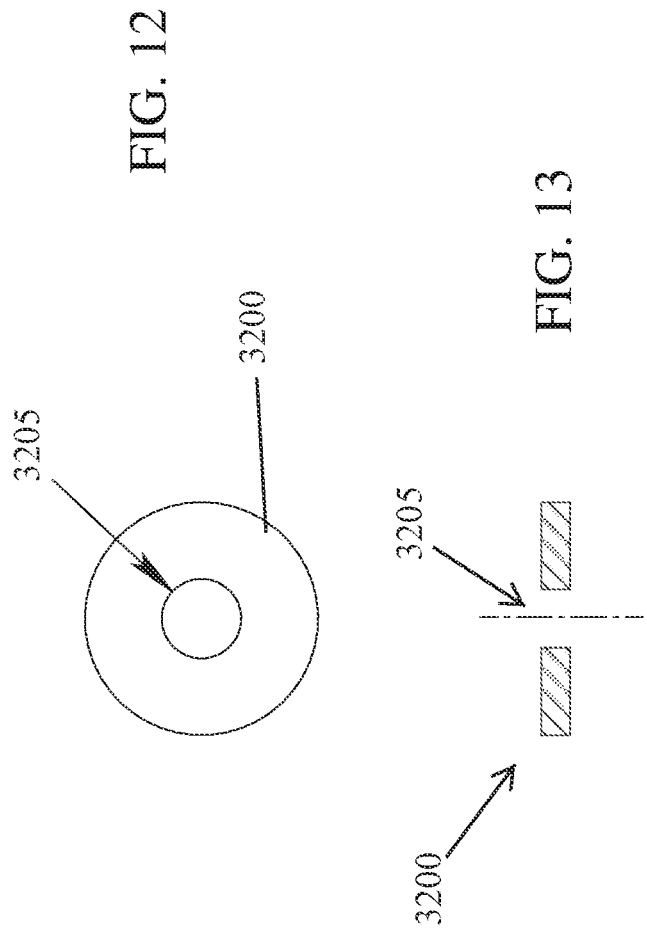
FIGS. 12 and 13 are various views of a preferred embodiment of the electrode insulation disk of the present invention.

FIGS. 12 and 13 show views of insulator disk 3200. Disk 3200 can have opening or hole 3205, which is sized and shaped to accommodate and fit end or tip 2275 of electrode 2250, as shown in FIG. 2. Insulation disk 3200 can be unfilled peek material or unfilled polyvinylidene fluoride (PVDF). In a most preferred embodiment, disk 3200 can be about 0.060 inches thick.

FIGS. 14 and 15 show various views of electrode receptacle thruholes 2370 that are sized and shaped to accommodate and fit back up plug or screw 2280, seal 2233, and electrode 2250 (as shown in FIGS. 2 and 4). Holes 2370 are bored through flow tube 20.

FIGS. 16-18 show various views of electrode UHP shield, designated generally by the numeral 2290. Shield 2290 can be made of stainless steel (e.g., fashioned from a 304 stainless steel bar). Shield 2290 can be about 0.800-1.500 inches long, more preferably about 1.00-1.500 inches long, and most preferably about 1.125 inches long. In one embodiment, shield 2290 has head or first end 2291 and second end 2292 with central opening 2295 preferably extending from head 2291 to end 2292. In a preferred embodiment, head 2291 and end 2292 each have a chamfer. In a preferred embodiment of the present invention, each chamfer is preferably about ⅓₂". In a preferred embodiment, shield 2290 has first lateral opening or bore 2293 that is generally perpendicular to central opening 2295 and extends through opening 2295. In a preferred embodiment, shield 2290 has second lateral opening or bore 2294. Bore 2294 is the hole through which electrode wire 2255 passes, as shown in FIG. 2.

PARTS LIST

The following is a list of parts and materials suitable for use in the present invention:

Parts Number Description
10 magnetic flow meter/magmeter/apparatus
20 flow tube/pipe 20
25 interior
30 liner
40 axis/central longitudinal axis
50 angle
2200 electrode assembly
2233 seal
2235 bore/opening of seal 2233
2238 gland/space
2240 Belleville spring washer/helical wire spring
2243 washer
2245 retaining nut
2250 electrode
2255 electrode wire
2260 electrode head
2261 first component/cone of head 2260/cone
226 second component of head 2260
2265 face/end/tip/disk/coating
2272 electrode shaft
2275 tip/end/end portion
2280 back up plug/screw
2281 end of back up plug 2280
2282 end of back up plug 2280
2285 bore/thruhole/opening of plug 2280
2290 shield
2291 head/first end of shield 2290
2292 second end of shield 2290
2293 first lateral opening or bore of shield 2290
2294 second lateral opening or bore of shield 2290
2295 opening/bore of shield 2290
2370 electrode receptacle thruhole/bore/opening
3200 insulator disk
3205 opening/hole of disk 3200

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. An electrode apparatus for use with a magnetic flowmeter, comprising:
   a. an electrode shaft having two opposing ends, with a tip at one end and an electrode head at the other end;
   b. with said electrode head having a first component and a second component,
   c. wherein said first component has a varying diameter and two opposing ends, with one end interfacing with the shaft, and the other end interfacing with the second component;
   d. wherein said first component is generally trapezoidal in shape in a side profile view, with said diameter as generally smaller at the interface with said shaft than at the interface with said second component;
   e. wherein said second component has two opposing ends, with one said end interfacing with said first component and the other end providing a face; and
   f. wherein said face protrudes into the interior of the magnetic flowmeter.

2. The electrode apparatus of claim 1, further comprising an exterior coating that provides electrical isolation from surrounding electrically conductive components.

3. The electrode apparatus of claim 1, wherein heat shrink tubing is used on said electrode shaft.

4. The electrode apparatus of claim 1, wherein heat shrink tubing is used on said electrode head.

5. The electrode apparatus of claim 4, wherein heat shrink tubing is used on said electrode shaft.

6. The electrode apparatus of claim 1, further comprising a seal that is sized and shaped to fit around said first component and a portion of said electrode shaft.

7. The electrode apparatus of claim 6, wherein said seal comprises glass filled polytetrafluoroethylene (PTFE).

8. An electrode apparatus for use with a magnetic flowmeter, comprising:
   a) an electrode shaft having two opposing ends, with a tip at one end and an electrode head at the other end;
   b) with said electrode head having a first component and a second component,
   c) wherein said first component has a varying diameter and two opposing ends, with one end interfacing with the shaft, and the other end interfacing with the second component;
   d) wherein said first component is generally trapezoidal in shape in a side profile view, with said diameter as generally smaller at the interface with said shaft than at the interface with said second component;
   e) wherein said second component has two opposing ends, with one said end interfacing with said first component and the other end providing a face;
   f) a seal that is sized and shaped to accommodate and fit around said first component of said electrode head and a portion of said electrode shaft, with said seal abutting said other end of said second component; and
   g) wherein said face protrudes into the interior of the magnetic flowmeter.

9. The electrode apparatus of claim 8, wherein said face comprises a tungsten carbide disk.

10. The electrode apparatus of claim 8, wherein said second component is a tungsten carbide disk.

11. The electrode apparatus of claim 9, wherein said tungsten carbide disk is attached to said second component by spot weld.

12. The electrode apparatus of claim 8, wherein said tip of said electrode shaft is threaded.

13. The electrode apparatus of claim 8, further comprising an exterior coating of alcadyne flourinox that provides electrical isolation from surrounding electrically conductive components.

\* \* \* \* \*